United States Patent [19]

Popovic

[11] Patent Number: 4,873,141

[45] Date of Patent: Oct. 10, 1989

[54] HIGH MECHANICAL STRENGTH WATER RESISTANT INSULATING MATERIAL AND A METHOD FOR PREPARING THE SAME

[75] Inventor: Vida Popovic, Kraljevo, Yugoslavia

[73] Assignee: Quill-Quartz GmbH, Munich, Fed. Rep. of Germany

[21] Appl. No.: 847,200

[22] Filed: Apr. 2, 1986

[30] Foreign Application Priority Data

Apr. 13, 1985 [YU] Yugoslavia ............................. 553185

[51] Int. Cl.$^4$ .............................................. D02G 3/00
[52] U.S. Cl. .................................... 428/357; 428/359; 428/375; 428/379; 428/392; 428/393; 428/401
[58] Field of Search .............. 428/357, 392, 393, 359, 428/375, 379, 401; 160/120

[56] References Cited

U.S. PATENT DOCUMENTS

| | | | |
|---|---|---|---|
| 3,501,324 | 3/1970 | Kubo | 106/120 |
| 3,505,439 | 4/1970 | Moorhead et al. | 106/120 |
| 3,902,913 | 9/1975 | Helser et al. | 106/119 |
| 4,128,434 | 12/1978 | Pusch | 106/120 |
| 4,131,638 | 12/1978 | Whitaker et al. | 106/120 |
| 4,193,958 | 3/1980 | Uchida et al. | 106/120 |

*Primary Examiner*—Lorraine T. Kendell
*Attorney, Agent, or Firm*—Helfgott & Karas

[57] ABSTRACT

The present invention relates to a new calcium-hydrosilicate based composition, consisting predominantly of 11 Å tobermorite of fibrous structure and having optionally incorporated therein a minor quantity of inorganic and/or organic fibers. The invention also relates to a wet method for the manufacture of such compositions and the use of the new resulting material in applications requiring good insulating properties and a mechanical strength.

4 Claims, No Drawings

HIGH MECHANICAL STRENGTH WATER RESISTANT INSULATING MATERIAL AND A METHOD FOR PREPARING THE SAME

The present invention relates to a new calcium hydrosilicate based material having thermal and electrical insulating, sound and vibration damping properties, a high mechanical strength and permanent water and carbon dioxide resistance and to a new method for the manufacture thereof. The invention also relates to the use of the new material in technical fields requiring very good universal insulating properties while possessing adequate mechanical strength and high thermal suitability.

Fiber containing thermo-insulating materials based on calcium-hydrosilicates are known. They are, however, not satisfactory as thermo-aggregates or for other uses under severe conditions as they either lack mechanical strength, especially when exposed to high temperatures, or insulating properties or both. As their thermal stability and water resistance have been poor, their use was limited. Commercially available calciumhydrosilicates exhibit a compressive resistance of 49 N/cm² after exposure to 1273.15° K.

Accordingly, the use of fiber containing thermoinsulating materials based on calcium-hydrosilicates is limited and the problem of finding a universal material combining insulating properties as well as mechanical strength and thermal stability has not yet been solved in the prior art.

The object of the present invention is a calcium-hydrosilicate based, fiber containing thermo-insulating material having excellent thermal and electrical insulating properties as well as excellent sound and vibration dampening properties, permanent $CO_2$ and water resistance and high mechanical strength.

It has now been found that a material based on calcium-hydrosilicate, predominantly comprising 11 Å tobermorite of fibrous structure, exhibits excellent thermal and electrical insulating as well as sound and vibration damping properties, permanent $CO_2$ and water resistance and a high mechanical strength, even at severe working conditions. Preferably the material will also contain a minor amount of inorganic and/or organic fiber. Optimum properties are obtained when the material is comprised of at least 80% by weight of 11 Å tobermorite having a well-crystallized fibrous structure. The present invention provides a new method for the manufacture of a calcium-hydrosilicate material, predominantly comprising 11 Å tobermorite having a fibrous structure and based on the following equation:

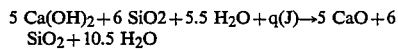

$$5\ Ca(OH)_2 + 6\ SiO_2 + 5.5\ H_2O + q(J) \rightarrow 5\ CaO + 6\ SiO_2 + 10.5\ H_2O$$

using a "wet" method starting from solutions or suspensions rather than prior art syntheses performed in a moist, molded or formed mass.

The method of the present invention is carried out by adding hydrated lime and pulverized quartz (particle size —max. 93 μm) and $SiO_2$ of at least 80% by weight, in a ratio of hydrated lime: $SiO_2 = 0.73$ to 0.76 successively to an aqueous solution containing 0.3 to 1.5% by weight of an alkali salt of carboxymethylcellulose, and then adding to the suspension 5 to 8 percent, calculated on the sold phase weight of inorganic or organic fibers having a maximum length of about 10 mm so that the ratio of solid and liquid phases in the suspension lies within the range of 4.5 to 5.5. The suspension is then filled into molds, which are autoclaved at a pressure of 7.0 to 11.0 bar for 12 to 16 hours, and the product is then removed from the molds and dried at a temperature of not more than 493° K.

Preferably the alkali salt of carboxymethycellulose is sodium carboxymethycellulose and the inorganic fibers are preferably asbestos fibers about 10 mm. long. Organic fibers are preferably flax, hemp or jute fiber about 10 mm. long.

It should be noted that the fibers are not added with the aim of reinforcing the structure of the calciumhydrosilicate but as additives to induce the crystallization to proceed towards the desired formation of 11 Å tobermorite having a well-crystallized fibrous structure. It is believed that the fibers may act as retardation agents during the synthesis, thus enabling the selective crystallization to 11 Å tobermorite to proceed. The high content of well-formed 11Å tobermorite was confirmed by X-ray diffraction analysis of the product.

After the completed formation of the 11 Å tobermorite crystals, the presence of fibers is not critical any more and they may be destroyed during a subsequent heating of the material to high temperatures.

The behavior of the new material is characteristic of a substantially homogeneous structural entity, whereas the prior art products were degraded into their individual ingredients when subjected to increased temperatures.

Due to these novel features of structure and texture, the material of the present invention is universally applicable in static, dynamic, thermal and the aggregates.

EXAMPLE 1

Hydrated lime (330 kg; CaO content 72 weight %) was added to a premix consisting of water (1.5 m³) and sodium carboxymethylcellulose (3 kg). Pulverized quart (309 kg; $SiO_2$ content 97.5 weight %; particle size <93 μm) was added to the premix admixture. The resulting mixture was added to a premix of chrysotile asbestos fibers (38 kg; about 10 mm long in water (12.3 m³). The components were thoroughly mixed by stirring and poured into molds (inside dimensions 1.2 m × 0.6 m × 0.3 m). The filled molds were autoclaved for 14 hours at a pressure of 9.18 to 10.2 bar. After hydrothermal treatment was completed, white colored blocks were removed from the molds, dried and tested.

EXAMPLE 2

Hydrated lime (4655.65 kg; CaO content 72 weight %) was added to a solution of sodium carboxymethycellulose (3.8 kg) in 2000 liters of water and pulverized quartz (463.5 kg $SiO_2$ content 97.5 weight %; particle size <93 μm) was added to the solution. The components were throughly mixed and the suspension was transferred into a second mixer containing 2200 liters water, 19 kg of flax fibers (10–12 mm long), and 48.5 kg of chrysotile asbestos fibers (approx. 10 mm long). All components were throughly mixed and the pulp-like suspension obtained was put into molds such as described in Example 1.

The filled molds were autoclaved under the following conditions:
1. preheating; 2.5 hours (up to 9.5 bar)
2. isobaric period: 11 hours at 9.5–10 bar
3. cooling: 3 hours The autoclaved blocks removed from the molds had a total volume of 3.65 m³ and a free water content of 79 weight % and were then dried for about 20 hours at approx. 448° K.

Blocks produced in accordance with Examples 1 and 2 had the following physical properties:
Bulk density: 220–280 kg/m³
Compressive resistance: 1470900–1,961,200N/m²
Flexural strength: 980,600–100,000N/m²
Total porosity: 75–85 %1
Linear shrinkage after 24 hours of heating at a mean temperature of 1273.15° K 1.8-2%
Apparent thermal conductivity at mean temperatures:

| | |
|---|---|
| 473.15° K. | 0.06978 W/mK |
| 573.15° K. | 0.0872 W/mK |
| 673.15° K. | 0.09769 W/mK |

The above tests were performed in accordance with:
ASTM C 165 (compressive properties)
ASTM C 203 (flexual strength)
ASTM C 203 (density)
ASTM C 365 (linear shrinkage)
ASTM C 518 (thermal transmission)
ASTM (air and Hg) methods for assaying porosity in refractory material (porosity)
Standard test JUS.U.J. 1.040, point 7 (burning test): the tested samples were not combustible.
Standard test JUS.U.J. 1.060, point 7 (inflammability test): the tested samples were not inflammable and the material was classified into class I.

The material having thermal and electrical insulating and sound and vibrations damping properties, a high mechanical strength and a permanent water and $CO_2$ resistance and based on Ca-hydrosilicate according to the invention is characterized in that the Ca-hydrosilicate comprises predominantly preferably at least 80 mass %, 11 Å tobermorite of fibrous structure wherein there is optionally incorporated a minor quantity of inorganic and/or organic fibres. This material has bulk density about 220-280 kg/m³, apparent thermal conductivity about 0.06978–0.1W/mK, compressive resistance about 1,500,000–1,900,000N/m², linear shrinkage after 24 hours of subjection to heat max. 2% at a mean temperature of 1273.15 K., thermal stability at temperatures exceeding 1573 K., and bending strength up to about 980,000N/m².

Evaluation according to the Regulations of Technical Measures and Conditions for the Acoustical Insulation of Brickwork (Official Gazette of Yugoslavia, No. 35/70). The acoustical insulation capacity of the tested wall boards having a thickness of 5 cm was 28 decibel. Mean deviation; —decibel. Mean value of sound transmittance reduction: 32 decibel.

The vibration damping property is unique feature of the material of present invention. The material of the present invention is resistant to humidity and absorbs moisture until an air-dry state is attained. It is also permanently stable in water. It does not leak water prior to complete saturation and may absorb more than five times its original weight. Thus, the material may be used in certain applications for hydro-insulating purposes. It is also frost resistant, even in a humid state.

After re-drying, the material exhibits its original characteristics. The diffusion resistance factor (the water vapor transmission value of the layer of the inventive material divided by the water vapor transmission value of a layer of air of equal thickness) was determined as $\mu$-17.8.

The new material is resistance to $CO_2$ gas as well as pests such as rodents and insects.

The product of the present invention has a white to brilliant white, very pleasant color which is suitable for application in architecture and food processing construction.

The material may be worked, e.g. by means of woodworking tools. The shaping may be completely performed during the manufacture of the material, especially if the required shapes are not attainable by means of cutting and sawing of the original, non-machined surfaces of the final product are preferred.

The surfaces of the shape pieces may be finished, e.g. painted, in any conventional manner.

It may be reasonably concluded that the material of the present invention has broad application in various technical fields. Without limiting the scope of possible modes of application which one skilled in the art might find, the following technical fields are contemplated by way of example: refactory materials electric and thermal insulation, power station equipment, building constructions, especially for unfavorable climates, furniture, protection of metallic constructions, cisterns, refrigerators, condensors, e.g. in chemical industry, aircraft and shipbuilding elements etc. An other interesting use might be the use as catalyst carrier.

What is claimed is:

1. A calcium-hydrosilicate based material having thermal and electrical insulating properties, sound and vibration damping properties, high mechanical strength, and permanent water and $CO_2$ resistance, comprising at least 80% by weight of 11Å tobermorite having a fibrous structure, said material comprising a bulk density of about 100–280 kg/m³, an apparent thermal conductivity of about 0.06978–0.1W/mK, a compressive resistance of about 1,500,000–1,900,000 n/m², a maximum linear shrinkage of 2% after 24 hours at a mean temperature of 1273.15° K., thermal stability at temperatures exceeding 1573° K., and a flexural strength of 980,600–1,000,000N/m².

2. A material as claimed in claim 1 wherein a minor quantity of a fiber selected from the group consisting of organic and inorganic fibers is included.

3. A material as claimed in claim 2, wherein the inorganic fibers are asbestos fibers having a length of about 10 mm.

4. A material as claimed in claim 2, wherein the organic fibers are flax, hemp or jute fibers having a length of about 10 mm.

* * * * *